United States Patent [19]

Fridez et al.

[11] Patent Number: 5,021,388

[45] Date of Patent: Jun. 4, 1991

[54] PROCESS FOR APPLYING A CATALYST LAYER COMPOSED OF NOBLE METALS AND/OR NOBLE-METAL COMPOUNDS TO A CARRIER MADE OF CERAMIC MATERIAL

[75] Inventors: Jean-Daniel Fridez, Wohlenschwil; Gabriele Gerharz, Untersiggenthal, both of Switzerland

[73] Assignee: Comprex AG, Baden, Switzerland

[21] Appl. No.: 334,371

[22] Filed: Apr. 6, 1989

[30] Foreign Application Priority Data

Apr. 26, 1988 [DE] Fed. Rep. of Germany ....... 3813946

[51] Int. Cl.$^5$ .................. B01J 23/38; B01J 21/12; B01J 21/08; C01B 41/88
[52] U.S. Cl. .................. 502/261; 423/213.5; 502/178; 502/200; 502/202; 502/207; 502/240; 502/262; 502/263; 502/439; 502/427
[58] Field of Search ........ 502/200, 202, 207, 261–263, 502/178, 240, 439; 423/213.5

[56] References Cited

U.S. PATENT DOCUMENTS

| 2,106,744 | 2/1938 | Hood et al. ............... 106/36.1 |
| 3,189,563 | 6/1965 | Havel ................. 423/213.5 |
| 3,804,647 | 4/1974 | Elmer et al. ............. 502/439 |
| 3,923,688 | 12/1975 | Hammel et al. ......... 502/207 |
| 3,956,185 | 5/1976 | Yagi et al. .............. 502/261 |
| 4,297,246 | 10/1981 | Cairns et al. ......... 423/213.5 |
| 4,749,671 | 6/1988 | Saito et al. ............ 502/200 |
| 4,764,498 | 8/1988 | Wissner et al. ......... 502/439 |

FOREIGN PATENT DOCUMENTS

| 0143956 | 6/1985 | European Pat. Off. . |
| 2359735 | 6/1974 | Fed. Rep. of Germany . |
| 2325774 | 12/1974 | Fed. Rep. of Germany . |
| 2433698 | 5/1975 | Fed. Rep. of Germany . |
| 3408342 | 9/1984 | Fed. Rep. of Germany . |
| 3421989 | 12/1984 | Fed. Rep. of Germany . |
| 3344343 | 6/1985 | Fed. Rep. of Germany . |
| 3523956 | 1/1987 | Fed. Rep. of Germany . |
| 82080 | 6/1971 | German Democratic Rep. ............. 502/207 |
| 56-26551 | 3/1981 | Japan ............ 502/262 |
| 56-26552 | 3/1981 | Japan ............ 502/261 |

OTHER PUBLICATIONS

Polat Oeser and Walter Brandstetter, "Principles of purifying the exhaust gases from automobile engines using the catalyst technique", MTZ Motortechnische Zeitschrift 45 (1984), 5, pp. 201-206.
Edgar Koberstein, "Catalysts for purifying vehicle exhaust gases", Chemie in unserer Zeit, vol. 18, 1984, No. 2, pp. 37-45.
A. F. M. Leenaars, K. Keizer and A. J. Bruggraf, "Porous alumina membranes", Chemtech, Sep. 1986, pp. 560-564.
R. J. Charles, "Phase Separation in Borosilicate Glasses", Journal of the American Ceramic Society--Charles, vol. 47, No. 11, pp. 559-563.
M. G. Nichols and D. A. Mortimer, "Ceramic/metal joining for structural application", (1985), The Institute of Metals, Materials Science and Technology, Sep. 1985, vol. 1, pp. 657-665.

*Primary Examiner*—Paul E. Konopka
*Attorney, Agent, or Firm*—Oblon, Spivak, McClelland, Maier & Neustadt

[57] ABSTRACT

Process for applying a catalyst layer (4) composed of noble metals and/or noble-metal compounds to a ceramic carrier (1), in which process at least one ceramic intermediate layer (2) based on a glaze is applied, subjected to a heat treatment and cooled down. The catalyst layer (4) is in turn deposited as a chemical, electrochemical or physical deposit. Variants with $\gamma$-$Al_2O_3$ intermediate layer or with $SiO_2$ intermediate layer or with Si intermediate layer.

3 Claims, 3 Drawing Sheets

PROCESS FOR APPLYING A CATALYST LAYER COMPOSED OF NOBLE METALS AND/OR NOBLE-METAL COMPOUNDS TO A CARRIER MADE OF CERAMIC MATERIAL

BACKGROUND OF THE INVENTION

1. Field of the Invention

Catalyst layers on ceramic carriers for converting exhaust gases from internal combusion engines.

The invention relates to compact devices for post-burning and detoxicating the exhaust gases from internal combustion engines of road vehicles, especially in relation to supercharger units.

In particular it relates to a process for applying a catalyst layer composed of noble metals and/or noble-metal compounds to a carrier made of ceramic material.

2. Discussion of Background

Catalysts for converting the exhaust gases of internal combustion engines (auto and diesel engines) are increasingly being used in particular for road vehicles, especially in view of the environmental pollution. The legal regulations in this connection are continuously becoming stricter and it is therefore in the interests of the general public to exploit all the possibilities for detoxicating exhaust gas. The following publications are cited in relation to the prior art:

Edgar Koberstein, Katalysatoren zur Reinigung von Autoabgasen (Catalysts for purifying vehicle exhaust gases), Chemie in unserer Zeit, Vol. 18, 1984, No. 2, pages 37–45

Polat Oeser and Walter Brandstetter, Grundlagen zur Abgasreinigung von Ottomotoren mit der Katalysatortechnik (Principles of purifying the exhaust gases from automobile engines using the catalyst technique), MTZ Motortechnische Zeitschrift 45 (1984), 5, pages 201–206

A.F.M. Leenaars, K. Kreize and A.J. Bruggraf, Porous alumina membranes, Chemtech Sep. 1986, pages 560–564

US-A-2,106,744

R.J. Charles, Phase Separation in Borosilicate Glasses, Journal of The American Ceramic Society-Charles, Vol. 47, No. 11, pages 550–563

M.G. Nicholas and D.A. Mortimer, Ceramic/metal joining for structural applications (1985) The Institute of Metals), Materials Science and Technology, Sep. 1985, Vol. 1, pages 657–665

EP-A-0,143,956.

EP-A-0,143,956 describes a volumetric supercharger unit (pressure-wave machine) for a road vehicle engine, which supercharger unit has a rotor which is also constructed as a catalyst carrier. This makes it possible to economize at least partly on a separate device for detoxicating the exhaust gases. However, problems arose in coating a rotor composed of a ceramic material since the rotor and, consequently, the catalyst layer are exposed to very high mechanical and thermal stresses (centrifugal forces, changes in temperature). The layers have to be securely anchored and must not peel off during operation.

There is therefore a considerable need for further development and perfection of the catalyst coating technology.

SUMMARY OF THE INVENTION

Accordingly, one object of this invention is to provide a process for applying a catalyst layer composed of noble metals and/or noble-metal compounds to a base made of ceramic material, which method can be applied in a simple manner even to complexly shaped bodies and yields securely adhering surface layers which do not peel off. The results should be reproducible. The process should furthermore be capable of being carried out cheaply. In particular, it should advantageously be applicable to $Si_3N_4$ ceramic.

This object is achieved by a process of the type mentioned in the introduction which comprises applying at least one ceramic intermediate layer based on a glass to the carrier and subjecting the whole to at least one heat treatment, and finally applying the catalyst layer to the intermediate layer by chemical, electrochemical or physical deposition.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
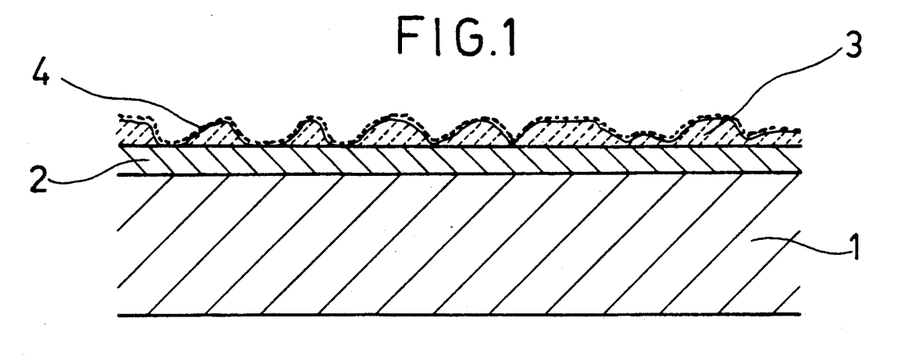
FIG. 1 shows a longitudinal section through a ceramic body having a catalyst layer according to process variant I.

Referring now to the drawings, wherein like reference numerals designate identical or corresponding parts throughout the several views, FIG. 1 shows a diagrammatic longitudinal section through a ceramic body having a catalyst layer according to process variant I. 1 is the carrier made of ceramic material, for example of silicon nitride $Si_3N_4$. 2 is a glazing made of a silicate glass on which there is a more or less continuous porous layer 3 of aluminum oxide $\gamma$-$Al_2O_3$. The catalyst layer 4 (noble metals of the platinum group and their compounds) indicated by points and dashes and having a large internal surface, is securely anchored on the $\gamma$-$Al_2O_3$ layer 3.

Figure 2:
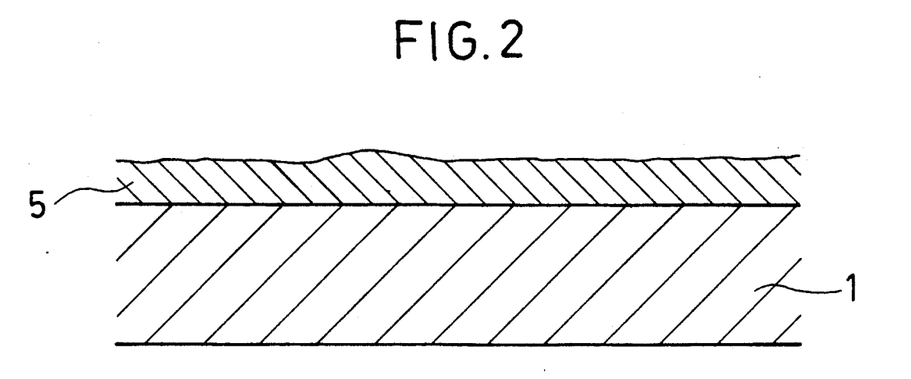
FIG. 2 shows a longitudinal section through a ceramic body having an applied borosilicate glass layer according to process variant II.

FIG. 2 relates to a diagrammatic longitudinal section through a ceramic body having an applied borosilicate layer according to process variant II. 1 is the carrier made of ceramic material, and 5 the borosilicate layer, for example based on the $Na_2O/B_2O_3/SiO_2$ system.

Figure 3:
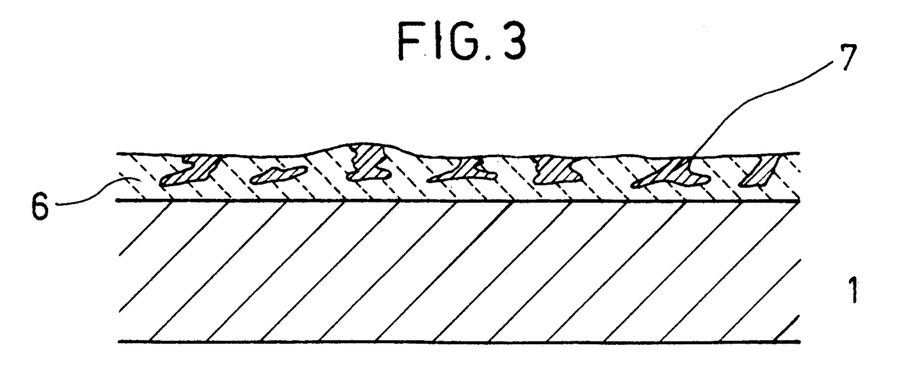
FIG. 3 shows a longitudinal section through a ceramic body having an applied layer after the demixing (process variant II)

FIG. 3 shows a diagrammatic longitudinal section through a ceramic body having an applied layer after the demixing (process variant II). 1 is the carrier made of ceramic material. The layer 5 originally applied (FIG. 2) is split up into two phases: the insoluble silicon dioxide layer ($SiO_2$) 6 and the islands 7 made of a soluble phase, in this case alkali-metal borate (for example sodium metaborate $NaBO_2$).

Figure 4:
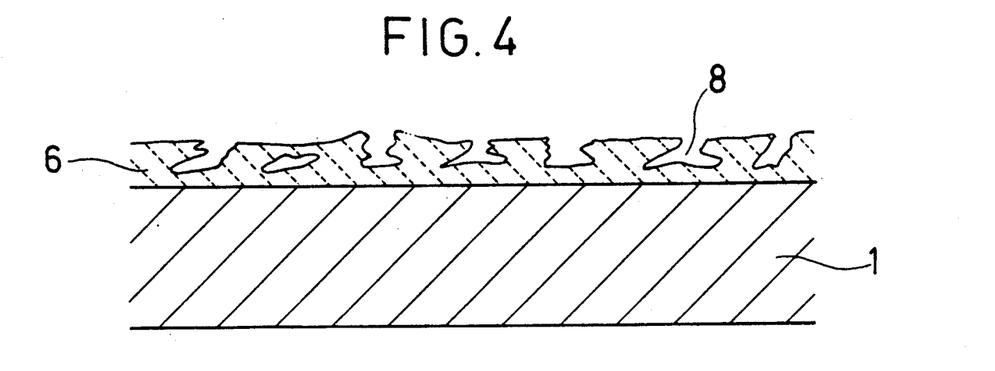
FIG. 4 shows a longitudinal section through a ceramic body having an $SiO_2$ layer (process variant II)

FIG. 4 shows a diagrammatic longitudinal section through a ceramic body having an $SiO_2$ layer (process variant II). 1 is the carrier made of ceramic material, for example $Si_3N_4$. 6 is the insoluble $SiO_2$ layer. After dissolving out the soluble phase 7 (FIG. 3) it has corresponding pores 8.

Figure 5:
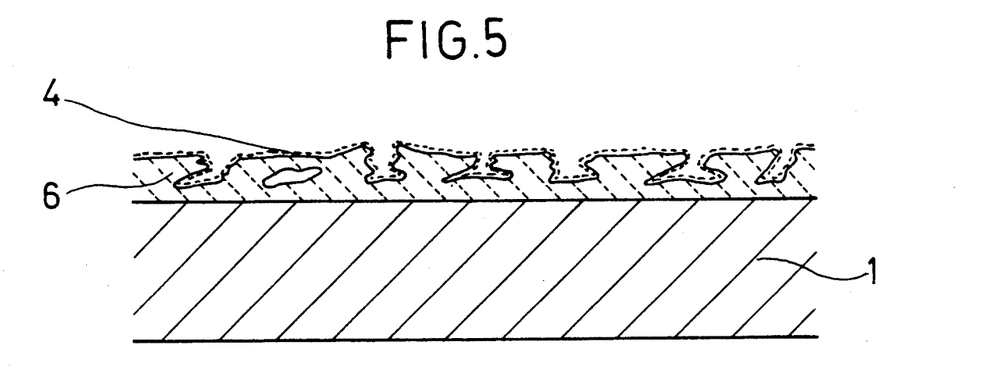
FIG. 5 shows a longitudinal section through a ceramic body having a catalyst layer according to process variant II.

FIG. 5 shows a diagrammatic longitudinal section through a ceramic body having a catalyst layer according to process variant II. 1 is the carrier made of ceramic material, 6 is the $SiO_2$ layer and 4 is the catalyst layer following the pores and having a large internal surface.

Figure 6:
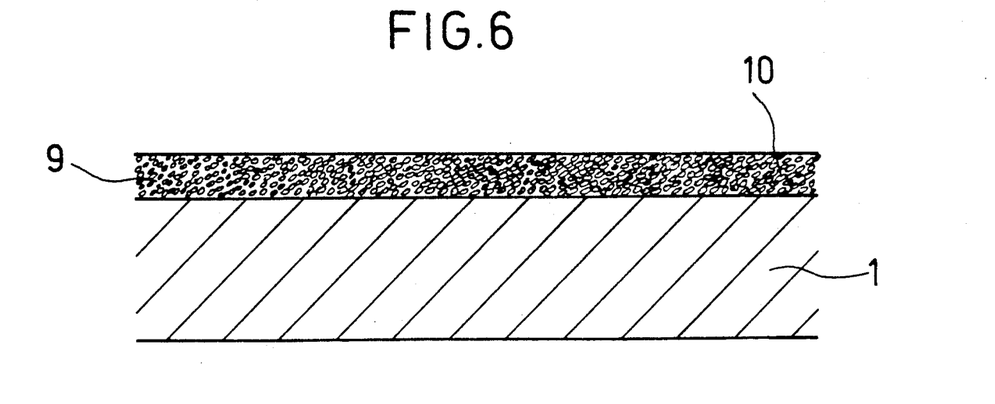
FIG. 6 shows a longitudinal section through a ceramic body having a slip layer according to process variant III.

FIG. 6 shows a diagrammatic longitudinal section through a ceramic body having a slip layer according to process variant III. 1 is the carrier made of ceramic material, 9 is the slip layer based on Si/ water glass/-$H_2O$ in the form of a suspension of silicon particles 10 in a water glass/water mixture.

Figure 7:
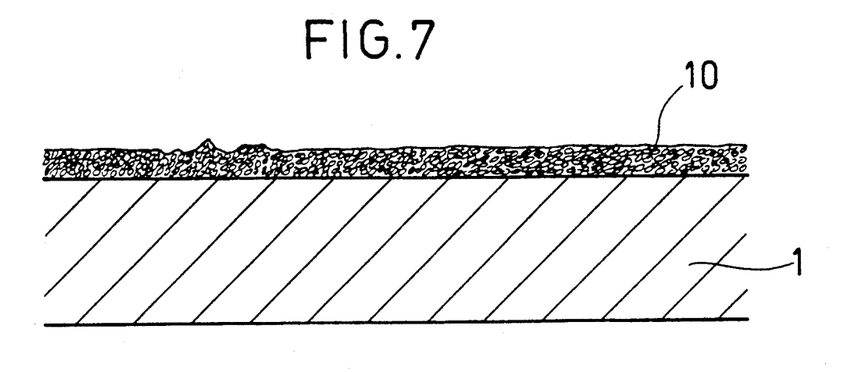
FIG. 7 shows a longitudinal section through a ceramic body having an Si sintered layer (process variant III)

FIG. 7 relates to a diagrammatic longitudinal section through a ceramic body having a silicon sintered layer (process variant III). 1 is the carrier made of ceramic material, to which the sintered layer composed of silicon particles 10 is firmly joined. In the same way, the silicon particles 10 are in firm mechanical and electrical contact with each other.

Figure 8:
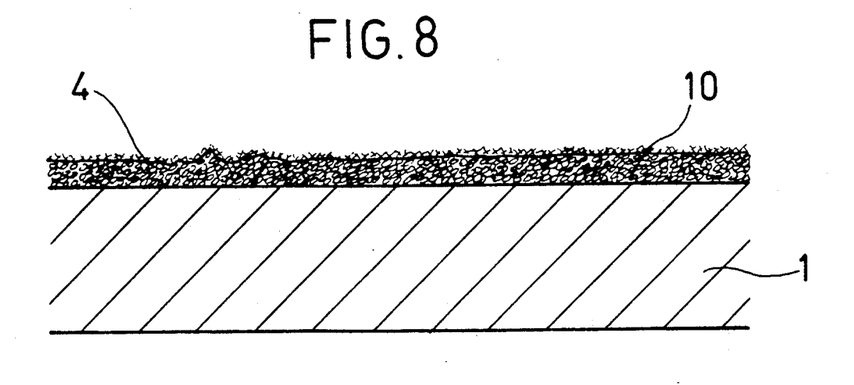
FIG. 8 shows a longitudinal section through a ceramic body having a catalyst layer according to process variant III.

FIG. 8 shows a diagrammatic longitudinal section through a ceramic body having a catalyst layer according to process variant III. 1 is the carrier made of ceramic material, 10 are the sintered silicon particles and 4 denotes the porous catalyst layer applied by a special electrolytic process and composed of finely dispersed particles of large internal surface.

EXEMPLARY EMBODIMENT 1

See FIG. 1

A hollow-cylindrical body was provided with a catalyst layer 4. The body serving as carrier 1 was composed of $Si_3N_4$, and had an outside diameter of 150 mm, an inside diameter of 140 mm (wall thickness = 5 mm) and an axial length of 120 mm. It was coated on all sides with a glaze slip of the following composition in a layer thickness of 10 μm:

Glass frit (K silicate glass): 65% by weight
Water: 34.5% by weight
Adhesive ("Relatin"; organic glue) 0.5% by weight The glaze 2 had a melting point of 800° C. and a coefficient of thermal expansion of $4 \times 10^{-6}/°$ C. A suspension composed of a suspension of boehmite γ-AlOOH in water was applied to the glaze 2 in a thickness of 50 μm. The whole was then dried and roasted for 20 min in air at a temperature of 800° C. This converted the boehmite into the γ-$Al_2O_3$ layer 3 which was firmly anchored to the glaze 2. A catalyst layer 4 composed of platinum and rhodium with 0.1 mg/m² average content was deposited on the porous γ-$Al_2O_3$ layer which had a large surface, by a standard chemical deposition process (from a salt solution).

EXEMPLARY EMBODIMENT 2

See FIGS. 2, 3, 4 and 5

A cylindrical component of an internal combustion engine was provided with a catalyst layer 4. The component serving as carrier 1 was composed of SiC and had an outside diameter of 150 mm and a length of 130 mm. The carrier 1 was first coated with a glaze slip composed of a glass frit, water and an adhesive:

Glass frit (alkali-metal borosilicate glass): 63% by weight
Water: 36.2% by weight
Adhesive (organic glue): 0.8% by weight The alkali-metal borosilicate glass had the following composition:

$Na_2O = 7.0\%$ by weight
$B_2O_3 = 24.5\%$ by weight
$SiO_2 = 68.5\%$ by weight The whole was dried and sintered for 15 min in air at a temperature of 1100° C.: borosilicate glass layer 5. The glaze was now subjected to a heat treatment in the subliquidus demixing range at a temperature of 700° C. for 12 hours. In this process, splitting up into 2 phases occurred, namely into an insoluble $SiO_2$ layer 6 and islands 7, embedded therein, made of an insoluble phase (alkali-metal borates). The alkali-metal borates of the islands 7 were dissolved out by etching with dilute HCl and the pores 8 formed in this way were post-ashed with NaOH and water. Then a catalyst layer 4 composed of platinum was applied by the chemical deposition process mentioned in Example 1.

EXEMPLARY EMBODIMENT 3

See FIGS. 6, 7 and 8

A cell rotor of a pressure-wave machine was provided with a catalyst layer 4. The rotor serving as carrier 1 was composed of $Si_3N_4$ and had an outside diameter of 150 mm and a length of 130 mm. The outer hollow-cylindrical part had a radial wall thickness of 4 mm, and the cell walls had a wall thickness of 1.5 mm. The carrier 1 was first coated with a slip composed of a suspension of silicon particles in water glass and water. The slip had the following composition:

Si particles: 60% by weight
Water glass: 20% by weight
Water: 20% by weight

The slip layer 9 applied to the carrier 1 had a thickness of 50 μm. The whole was dried and subjected to a heat treatment for 10 min in a nitrogen atmosphere at a temperature of 1050° C. During this process, the SiC particles 10 sintered together and were firmly joined to the carrier 1. A catalyst layer 4 made of rhodium was electrolytically applied to the electrically conducting layer thereby formed by the electrolytic deposition process.

The invention is not restricted to the exemplary embodiments. A catalyst layer 4 can in principle be applied to a carrier 1 made of ceramic material of virtually any composition after preparing at least one intermediate layer by the abovementioned methods. This includes preferably $Si_3N_4$, SiC, and $Al_2O_3$. The catalyst layer 4 is composed of noble metals and/or noble-metal compounds, preferably of the platinum group, which are applied to at least one ceramic intermediate layer (2; 3; 6; 9) based on a glass. The whole is subjected to at least one heat treatment. The catalyst layer 4 is applied by chemical, electrochemical or physical deposition.

According to a first process variant, a glaze slip which has a melting point not exceeding 800° C. and which has a low coefficient of thermal expansion is used for the intermediate layer. After applying the second layer made of γ-AlOOH in water, the whole is roasted for 10 to 60 min in air at a temperature of 800° C. and cooled down to room temperature to form a γ-Al$_2$O$_3$ layer 3 embedded in the glaze.

According to a second process variant, a borosilicate glass 5 of the type R$_2$O/B$_2$O$_3$/SiO$_2$ where R=Na, K, Li, and further water and an organic adhesive are used for the intermediate layer. After drying, sintering is carried out for 3 to 30 min in air at a temperature of 1100° C., roasting is carried out for 5 to 30 h in the subliquidus demixing range (around 500 to 750° C.), followed by cooling down. The soluble alkali-metal borate phase 7 formed in this process is dissolved out by etching. Then the catalyst layer 4 is applied to the microporous SiO$_2$ layer 6 formed in this way.

According to a third process variant, a slip 9 composed of a suspension of silicon particles 10 in water glass is prepared and the carrier 1 is coated therewith. The whole is dried and roasted for 3 to 30 min in a nitrogen atmosphere at a temperature of 1050° C. After cooling down, the catalyst layer 4 is applied electrolytically to the intermediate layer rendered semiconducting in this way.

Obviously, numerous modifications and variations of the present invention are possible in the light of the above teachings. It is therefore to be understood that within the scope of the appended claims, the invention may be practiced otherwise than as specifically described herein.

What is claimed as new and desired to be secured by letters patent of the U.S. is:

1. A process for applying a layer of exhaust gas cleaning catalyst to a ceramic rotor substrate comprising the steps:
   (a) applying to a ceramic rotor at least one intermediate layer of a silicate glass frit, water and an organic adhesive capable of forming a glaze slip with the silicate glass frit, wherein said glaze slip has a melting point not exceeding 800° C. and a low coefficient of thermal expansion; and step a) further comprises applying another layer containing a suspension of boehmite γ-AlOOH in water then drying;
   (b) heat treating the whole to form a glaze, whereby a γ-Al$_2$O$_3$ layer is embedded in the glaze slip,
   (c) depositing a noble meal catalyst layer on said intermediate layer by chemical, electrochemical or physical deposition.

2. A process for applying a layer of exhaust gas cleaning catalyst to a ceramic rotor substrate comprising the steps;
   (a) applying to a ceramic rotor substrate at least one intermediate layer of a slip containing a suspension of silicon particles in water glass which is then dried;
   (b) heat treating the whole to form a glaze;
   (c) depositing a noble metal catalyst layer on said intermediate layer by chemical, electrochemical or physical deposition.

3. The process of claim 2, wherein b) comprises:
   a heat treatment in nitrogen; and step c) comprises: depositing said catalyst layer by electrolytic deposition.

* * * * *

UNITED STATES PATENT AND TRADEMARK OFFICE
CERTIFICATE OF CORRECTION

PATENT NO. : 5,021,388                    Page 1 of 5

DATED      : June 4, 1991

INVENTOR(S) : Jean-Daniel Fridez, et al

It is certified that error appears in the above-identified patent and that said Letters Patent is hereby corrected as shown below:

The title page should be deleted to appear as per attached title page.

The sheets of Drawings consisting of Figs. 1 thur 8 should be added as per attached sheet.

Signed and Sealed this

Seventh Day of April, 1992

*Attest:*

HARRY F. MANBECK, JR.

*Attesting Officer*      *Commissioner of Patents and Trademarks*

United States Patent [19]

Fridez et al.

[11] Patent Number: 5,021,388
[45] Date of Patent: Jun. 4, 1991

[54] PROCESS FOR APPLYING A CATALYST LAYER COMPOSED OF NOBLE METALS AND/OR NOBLE-METAL COMPOUNDS TO A CARRIER MADE OF CERAMIC MATERIAL

[75] Inventors: Jean-Daniel Fridez, Wohlenschwil; Gabriele Gerharz, Untersiggenthal, both of Switzerland

[73] Assignee: Comprex AG, Baden, Switzerland

[21] Appl. No.: 334,371

[22] Filed: Apr. 6, 1989

[30] Foreign Application Priority Data

Apr. 26, 1988 [DE] Fed. Rep. of Germany ....... 3813946

[51] Int. Cl.$^5$ .................. B01J 23/38; B01J 21/12; B01J 21/08; C01B 41/88
[52] U.S. Cl. ........................... 502/261; 423/213.5; 502/178; 502/200; 502/202; 502/207; 502/240; 502/262; 502/263; 502/439; 502/427
[58] Field of Search ........ 502/200, 202, 207, 261–263, 502/178, 240, 439; 423/213.5

[56] References Cited

U.S. PATENT DOCUMENTS

| 2,106,744 | 2/1938 | Hood et al. | 106/36.1 |
|---|---|---|---|
| 3,189,563 | 6/1965 | Havel | 423/213.5 |
| 3,804,647 | 4/1974 | Elmer et al. | 502/439 |
| 3,923,688 | 12/1975 | Hammel et al. | 502/207 |
| 3,956,185 | 5/1976 | Yagi et al. | 502/261 |
| 4,297,246 | 10/1981 | Cairns et al. | 423/213.5 |
| 4,749,671 | 6/1988 | Saito et al. | 502/200 |
| 4,764,498 | 8/1988 | Wissner et al. | 502/439 |

FOREIGN PATENT DOCUMENTS

| 0143956 | 6/1985 | European Pat. Off. | |
| 2359735 | 6/1974 | Fed. Rep. of Germany | |
| 2325774 | 12/1974 | Fed. Rep. of Germany | |
| 2433698 | 5/1975 | Fed. Rep. of Germany | |
| 3408342 | 9/1984 | Fed. Rep. of Germany | |
| 3421989 | 12/1984 | Fed. Rep. of Germany | |
| 3344343 | 6/1985 | Fed. Rep. of Germany | |
| 3523956 | 1/1987 | Fed. Rep. of Germany | |
| 82080 | 6/1971 | German Democratic Rep. | 502/207 |
| 56-26551 | 3/1981 | Japan | 502/262 |
| 56-26552 | 3/1981 | Japan | 502/261 |

OTHER PUBLICATIONS

Polat Oeser and Walter Brandstetter, "Principles of purifying the exhaust gases from automobile engines using the catalyst technique", MTZ Motortechnische Zeitschrift 45 (1984), 5, pp. 201–206.

Edgar Koberstein, "Catalysts for purifying vehicle exhaust gases", Chemie in unserer Zeit, vol. 18, 1984, No. 2, pp. 37–45.

A. F. M. Leenaars, K. Keizer and A. J. Bruggraf, "Porous alumina membranes", Chemtech, Sep. 1986, pp. 560–564.

R. J. Charles, "Phase Separation in Borosilicate Glasses", Journal of the American Ceramic Society--Charles, vol. 47, No. 11, pp. 559–563.

M. G. Nichols and D. A. Mortimer, "Ceramic/metal joining for structural application", (1985), The Institute of Metals, Materials Science and Technology, Sep. 1985, vol. 1, pp. 657–665.

Primary Examiner—Paul E. Konopka
Attorney, Agent, or Firm—Oblon, Spivak, McClelland, Maier & Neustadt

[57] ABSTRACT

Process for applying a catalyst layer (4) composed of noble metals and/or noble-metal compounds to a ceramic carrier (1), in which process at least one ceramic intermediate layer (2) based on a glaze is applied, subjected to a heat treatment and cooled down. The catalyst layer (4) is in turn deposited as a chemical, electrochemical or physical deposit. Variants with $\gamma\text{-}Al_2O_3$ intermediate layer or with $SiO_2$ intermediate layer or with Si intermediate layer.

3 Claims, 3 Drawing Sheets